United States Patent
Joh et al.

(10) Patent No.: US 8,447,472 B2
(45) Date of Patent: May 21, 2013

(54) METHOD AND SYSTEM FOR IMPACT TIME AND VELOCITY PREDICTION

(75) Inventors: Gyu Myeong Joh, Bloomfield Hills, MI (US); Anthony Gerald King, Ann Arbor, MI (US); Wangdong Luo, Auburn Hills, MI (US); Mark Alan Shehan, Ypsilanti, MI (US); Charlie Yung Kang Hung, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1163 days.

(21) Appl. No.: 11/653,604

(22) Filed: Jan. 16, 2007

(65) Prior Publication Data
US 2008/0172156 A1 Jul. 17, 2008

(51) Int. Cl.
*G05D 1/00* (2006.01)
*G06F 7/70* (2006.01)

(52) U.S. Cl.
USPC ............ 701/45; 701/46; 701/47; 701/36; 701/34; 701/29; 701/70; 701/301

(58) Field of Classification Search
USPC ..................................................... 701/301
See application file for complete search history.

(56) References Cited

U.S. PATENT DOCUMENTS

| | | | | |
|---|---|---|---|---|
| 4,926,050 A | * | 5/1990 | Shemwell | 250/559.38 |
| 5,451,960 A | | 9/1995 | Kastella et al. | |
| 5,457,394 A | * | 10/1995 | McEwan | 324/642 |
| 5,471,214 A | * | 11/1995 | Faibish et al. | 342/70 |
| 5,638,281 A | * | 6/1997 | Wang | 701/301 |
| H1783 H | * | 2/1999 | McLean | 356/5.04 |
| 5,870,180 A | * | 2/1999 | Wangler | 356/4.01 |
| 6,085,151 A | * | 7/2000 | Farmer et al. | 701/301 |
| 6,373,806 B1 | * | 4/2002 | Kitamura et al. | 369/103 |
| 6,486,831 B1 | | 11/2002 | Martorana et al. | |
| 6,763,318 B1 | | 7/2004 | Winter et al. | |
| 6,816,804 B1 | * | 11/2004 | Lee | 702/148 |
| 6,861,973 B2 | * | 3/2005 | Kishida | 342/109 |
| 6,898,528 B2 | | 5/2005 | Zorka et al. | |
| 6,975,246 B1 | * | 12/2005 | Trudeau | 340/903 |
| 7,009,500 B2 | | 3/2006 | Rao et al. | |
| 7,012,560 B2 | * | 3/2006 | Braeuchle et al. | 342/70 |
| 7,016,782 B2 | * | 3/2006 | Schiffmann | 701/301 |
| 7,038,617 B1 | * | 5/2006 | Ferrante | 342/160 |
| 7,369,941 B2 | * | 5/2008 | Schiffmann et al. | 701/301 |
| 7,388,513 B2 | * | 6/2008 | Kubo | 340/903 |
| 7,451,033 B2 | * | 11/2008 | Xu et al. | 701/70 |
| 2005/0083184 A1 | * | 4/2005 | Bos et al. | 340/435 |
| 2005/0131646 A1 | | 6/2005 | Camus | |
| 2005/0134440 A1 | * | 6/2005 | Breed | 340/435 |
| 2005/0197770 A1 | * | 9/2005 | Schiffmann et al. | 701/301 |
| 2005/0232463 A1 | * | 10/2005 | Hirvonen et al. | 382/103 |
| 2006/0091654 A1 | | 5/2006 | De Mersseman et al. | |
| 2006/0092073 A1 | | 5/2006 | Boecker et al. | |
| 2006/0132354 A1 | | 6/2006 | Beard et al. | |
| 2006/0151223 A1 | | 7/2006 | Knoll | |

* cited by examiner

*Primary Examiner* — Ian Jen
(74) *Attorney, Agent, or Firm* — Franklin MacKenzie; Ford Global Technologies, LLC

(57) ABSTRACT

A collision detection system includes at least one sensor. The data from the sensor is input to a recursive filter which selectively uses the input to predict the motion of a target object relative to a host vehicle. The recursive filter continues to use the data from the sensor until the target object is within a threshold distance of the host vehicle. Within the threshold distance, the sensor does not reliably provide accurate data. Accordingly, the recursive filter omits the sensor input from motion estimates when the target object is within the threshold distance, which leads to significant improvement in target motion prediction.

11 Claims, 5 Drawing Sheets

METHOD AND SYSTEM FOR IMPACT TIME AND VELOCITY PREDICTION

TECHNICAL FIELD

The disclosure generally relates to improved prediction of impact time and impact velocity in vehicle collision detection systems.

BACKGROUND

In the continuing effort to make vehicles safer, more automakers are beginning to incorporate collision detection systems in their vehicles. Collision detection systems usually include an object tracking system that receives inputs from sensors mounted on a host vehicle. The sensors usually detect objects in the vicinity of the host vehicle. The object tracking system uses the information from the sensors to determine the track of the target object. The track of the target object generally includes information such as the position, velocity and acceleration of the target object relative to the host vehicle. While a collision detection system could use only a single sensor, systems generally include a plurality of sensors acting in concert to more accurately locate and track a target object. The object tracking system performs calculations using the information provided by the sensors to determine the information regarding the relative motion of the target object The ranging sensors used by the collision detection system usually include a combination of short-range, mid-range and long-range sensors. Long-range and mid-range sensors often include radar systems and visioning systems, which are able to discern information regarding the distance to an object, as well as the size and shape of an object, while it is still a relatively long distance to the host vehicle. Long range sensors can also be LIDAR (Light Intensified Detection And Ranging) or LADAR (Light Amplified Detection And Ranging) sensors. These sensors provide advanced warning of target objects, allowing the objects to be tracked as the host vehicle approaches. Short range sensors are usually used to provide more accurate data regarding objects within the immediate vicinity of the host vehicle, to allow the most accurate possible readings prior to a collision. Short range sensors usually operate at a higher frequency than long range sensors, allowing the information provided therefrom to be updated more frequently. One common short range sensor is a LIDAR (Light Detection and Ranging) sensor. A LIDAR system uses lasers to provide an accurate, high-frequency signal identifying a close-range object.

To provide the best view, and consequently to obtain the best results, from the short range sensor, it is desirable to mount the sensors at the highest practical point on the vehicle. In practice, this usually leads to the short range sensor being mounted behind the windshield near the roof line, positioned on a slight downward angle. Mounting the sensor behind the windshield not only protects the sensor, but allows the sensor's view to be kept clean through the use of windshield wipers. The downward angle of the beam path is useful as it covers a broad vertical spectrum in front of the host vehicle. That is, the beam is capable of detecting objects even when they are very close to the ground. Further, beams from the short range sensors are likely to contact a target at the point closest to the host vehicle, providing accurate distancing information to the sensors. Long range sensors, especially LIDAR or vision sensors, are also sometimes mounted behind the windshield to protect the sensor and keep the view clean through the use of windshield wipers.

The object tracker system uses the information provided by the sensors to develop an accurate picture of the relative motion of the target object. Object tracker systems generally use a recursive filter to develop and refine estimations of the motion of target objects. One recursive filter which is often used in automotive applications is the Kalman filter. An advantage to using a recursive filter, such as the Kalman filter, is the ability of the filter to provide an accurate estimate of a property based on noisy input data, such as that provided by the sensors. The filter develops an initial estimate of the desired property or properties, such as position, velocity, acceleration, etc, and then compares the estimate with a subsequent sensor reading. These properties are called a state. The estimate is then refined based on mathematical estimates augmented by subsequent sensor readings to produce an even more accurate estimate. This cycle continues with each subsequent sensor reading to continually update the state estimation. Thus, as long as the sensor is providing accurate information to the filter, the estimate will continue to improve. When multiple sensors are available, multiple sensor readings can be used to improve estimates. However, when a near field target is detected by both a short range sensor and a long range sensor, the readings from the short range sensor will dominate the calculations performed by the recursive filter, as they are likely to be more accurate, and are updated more frequently.

Based on the estimated relative motion of an object, the collision detection system is able to estimate whether there is likely to be a collision between a host vehicle and the object. If such a collision is likely, the system is able to estimate when such a collision will occur (the "impact time"), and the relative velocity of the vehicles at that time (the "impact velocity"). This information can be used by a collision detection system to prepare or activate safety features in a vehicle, such as seat belt pretensioners and airbags, to help ensure the safety of the vehicle's occupants.

While the above methods have resulted in continually improved performance in collision avoidance systems, challenges remain and additional improvements are possible. Recursive filters in known systems continually update estimates of motion properties using readings from short range sensors until a collision actually occurs. While this may seem like an optimal situation, allowing the most accurate tracking of an object, this is not always the case. Subsequent estimates from the recursive filter are limited in their accuracy by the quality of the information received from the sensors. While sensors can provide accurate information in the area closely proximate the host vehicle, the geometries of the target objects can actually cause errant readings (i.e., with non-Gaussian errors) in the moments immediately preceding a collision.

As stated previously, short range sensors and some long range sensors are typically mounted high behind a windshield, pointed at a downward angle. Assuming the sensor is a short range LIDAR sensor, the sensor emits a series of beams. The beams travel downwardly until they impinge on a target, at which point they reflect back to the sensor. By analyzing the reflected signals, the distance to the target object can be determined, and refined, as explained above. Due in part to the downward pointed sensor and the plurality of beams, the sensor detects the point of the object which is closest to host vehicle. This allows the most accurate prediction of when the host vehicle will collide with the object (as the host vehicle will impact the object at the closest point). This works well as long as the sensor is able to "see" the closest point of the target object. However, when the host vehicle and the target object are within a certain distance of each other, the geometry of the beam from the host vehicle may be such that the beam from the sensor may not be able to impinge on the nearest point of the target. For instance, if the host vehicle is approaching a target vehicle from behind, the beam may initially impinge on the rear face of the vehicle. As the host vehicle gets closer, however, the beam may impinge on a rear contour of the vehicle, such as the upper, inwardly sloping surface of a trunk. As the vehicles become even closer, the beam may even impinge on the rear window. When the beam impinges on a spot other than the point nearest the host vehicle, the sensor readings will be incorrect. In other words, the sensor measurement errors are biased and not satisfying the Gaussian distribution assumed by the recursive filter. Consequently, estimates of the relative motion and position of the target object will be incorrect, as will estimates of impact time and impact velocity. This effect exists also for long range sensors mounted in the windshield. What is needed therefore is a collision detection system having improved short range performance to provide more accurate prediction of impact time and velocity.

SUMMARY

The present disclosure relates to an improved system and method for collision detection providing improved prediction of impact time and impact velocity. An exemplary system includes a vehicle having at least one sensor, capable of reading data related to a target object, such as a pedestrian, a tree or another vehicle. The system also includes a recursive filter, such as a Kalman filter, in communication with the sensor. The recursive filter uses the data from the sensor to determine the relative motion of the target object, such as the object's position, velocity and acceleration relative to a host vehicle, as well as to predict the time and velocity at which the host vehicle will impact the target object. The sensor continues to gather information regarding the target object, which is continually provided to the recursive filter. The filter uses the sensor information to refine the predicted impact time and impact velocity, until the target object comes within a certain distance of the host vehicle, referred to hereinafter as the "threshold distance". When the target object is within this threshold distance, there is a chance that the sensor will obtain a faulty reading, as explained above. That is, the sensor cannot be relied upon to provide accurate data when the distance to the target object is within the threshold distance. Due to the lack of reliability of the sensor data, when the host vehicle is within this certain distance to the target object, the filter will disregard additional sensor input. The impact time and velocity prediction will be based on up to the last "accepted" sensor readings. These impact time and impact velocity predictions may be used, for example, by a vehicle safety system to pretension seat belts, apply brakes, deploy airbags, or any other action desired to prevent or mitigate damage from an accident.

Embodiments of such a system include at least one ranging sensor, such as a short range LIDAR sensor, in communication with a recursive filter, such as a Kalman filter.

To provide optimal results, the proposed system selectively utilizes the signal from the ranging sensor, based on the relative distance of the target object. When a target object is within a given distance of the host vehicle, the system ceases to refine the state-estimation based on sensor readings. By disregarding additional sensor readings, the incorrect information provided by the ranging sensor due to the proximity of the target vehicle is not factored in to the tracking computation. This leads to a significant improvement in impact time and impact velocity prediction.

A method is also provided for prediction of impact time and velocity. The method includes sensing relative motion of a target object, such as a pedestrian, a tree or another vehicle using at least one sensor. The method further includes using a recursive filter, such as a Kalman filter, to determine the track of the target object, such as relative object distance, speed, acceleration, etc., and to predict the time and velocity at which the host vehicle is likely to impact the target object. When a target object is within a given distance of the host vehicle, the recursive filter ceases to incorporate updated sensor readings when refining the state estimation, and thereby ceases to factor the sensor readings into predictions of impact time and velocity. In so doing, the above method provides significantly improved prediction of impact time and impact velocity.

DETAILED DESCRIPTION

Figure 1A:
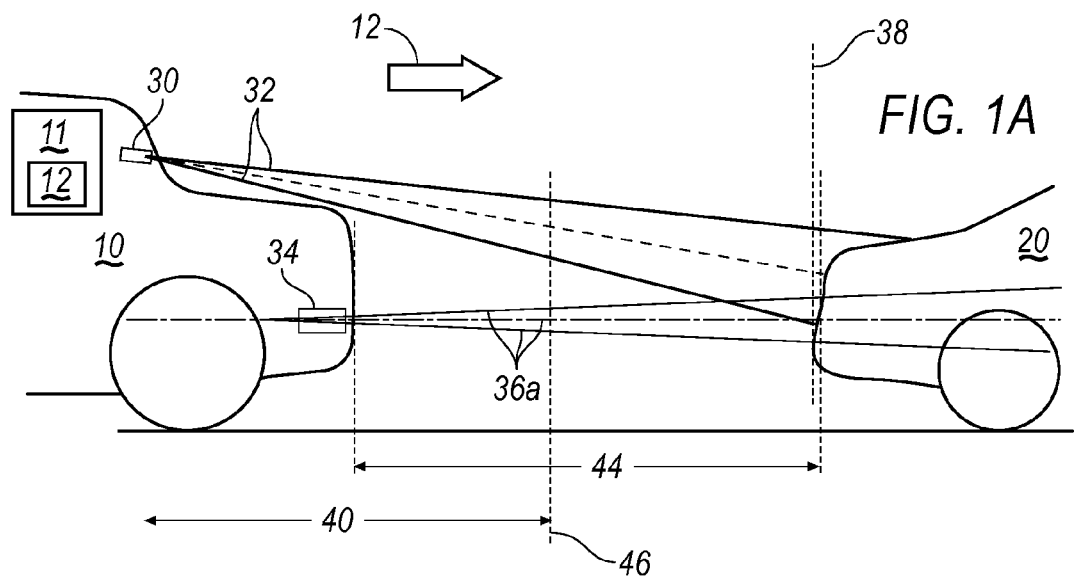
FIGS. 1A through 1C are side views of a vehicle employing a short range sensor, according to an embodiment.

Referring now to the drawings, preferred illustrative embodiments are shown in detail. Although the drawings represent some embodiments, the drawings are not necessarily to scale and certain features may be exaggerated, removed, or partially sectioned to better illustrate and explain the present disclosure. Further, the embodiments set forth herein are not intended to be exhaustive or otherwise limit or restrict the claims to the precise forms and configurations shown in the drawings and disclosed in the following detailed description. It is to be understood that sensor types and locations listed herein are meant to be illustrative only and additional types and locations of sensors may be used without parting from the scope of this disclosure.

Figure 1B:
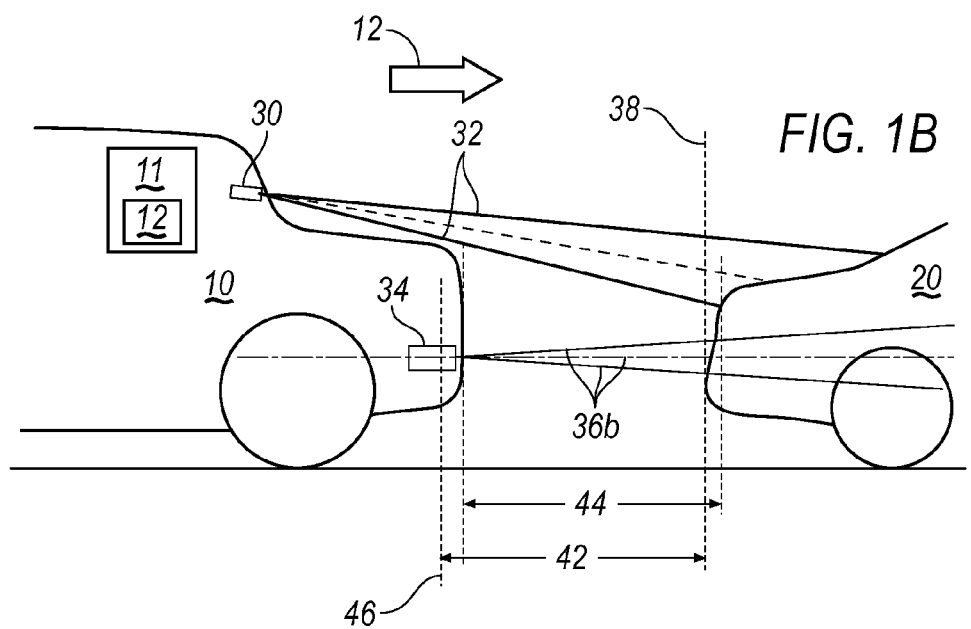
Figure 1C:
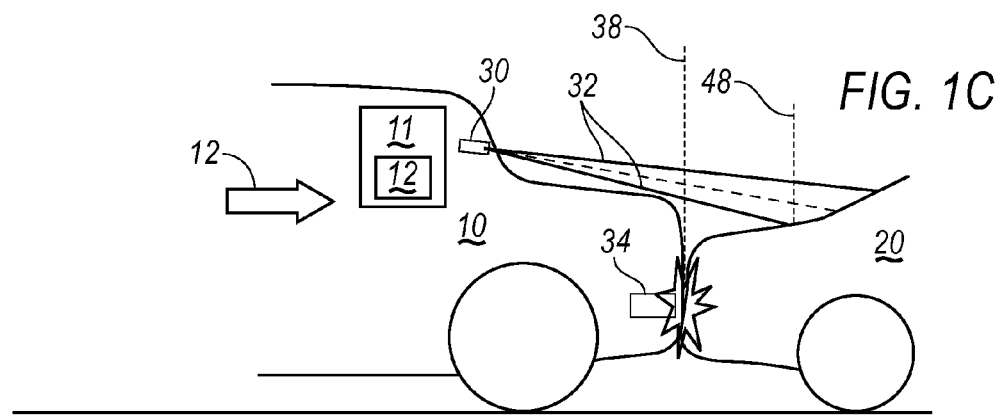

FIGS. 1A-1C illustrate a vehicle employing a series of sensors as part of a collision detection system. The system shown in FIGS. 1A-1C is exemplary of many systems currently in use. The series of figures exemplifies known issues with collision avoidance systems, and further exemplifies how the present disclosure overcomes those deficiencies. The system is used here for exemplary purposes only and is not meant to be limiting.

A host vehicle 10 is illustrated approaching a target object 20, which in this case is another vehicle. The target object could also be any other object without departing from the scope of this disclosure. The host vehicle 10 is shown in this embodiment having two sensors, 30 and 34, though the system could include a single sensor, or could include three or more sensors, without parting from the present disclosure. Host vehicle 10 further includes an impact detection system 11 including a recursive filter 12. The collision detection system uses the information provided by the sensor 30 to estimate the relative distance, velocity, and acceleration of a target object 20. It is to be understood that the collision detection system could also determine other motion properties, as required by a given situation.

Host vehicle 10 progressively approaches target object 20. In FIG. 1A the host vehicle 10 travels (12) through a first area 40 during which short range sensor 30 detects the rear face of target object 20. In FIG. 1B the host vehicle 10 has passed the threshold point 46 at which point the short range sensor 30 begins to detect a contoured upper rear portion of target vehicle 20. From the moment when the host vehicle 10 reaches threshold point 46 and travels through threshold distance 42, until the host vehicle 10 collides with the target object 20 at point 48, the collision detection system omits the readings from the short range sensor 30.

The host vehicle 10 has a sensor 30 mounted behind the windshield. In one embodiment, the sensor 30 is a short range sensor, such as a LIDAR system, though the sensor could take any form appropriate for the application. The host vehicle of the illustrative embodiment further includes sensor 34. Sensor 34 could be a long range sensor, such as a radar system, a mid-range sensor, or any other type of sensor as is appropriate to the given situation. A long- or mid-range sensor 34 is useful for tracking objects which are beyond the range of the short-range sensor 30. While long-range and mid-range sensors are often capable of detecting objects in the short range, they are usually not optimal in the short range, as their frequency is often less than is desirable for short range object detection and their measurement errors are bigger.

The short range sensor 30 has a detection method appropriate to the sensor type. The exemplary sensor shown in FIGS. 1A-1C is a LIDAR sensor, which uses one or more light beams 32 to detect a target object 20. When an object 20 is within range of the short-range sensor 30, it is critical that the sensor 30 provide an accurate measurement of the distance to the target object 20. The distance of interest is, of course, the distance to the nearest point of the target object 20, which is the point which the host vehicle 10 would first contact in the case of a collision. This is demonstrated in FIG. 1A where the light beam 32 of sensor 30 impinges on the rear face of the target object 20. By contacting the target object 20 at its rear face, the sensor 30 obtains an accurate reading of the distance to the target object 20. Hence the estimated distance 44 computed by this reading is accurate.

FIG. 1B illustrates the host vehicle 10 as it more closely approaches the target object 20. The design of the target object 20 in this embodiment includes a contoured rear portion, defining, for example, a trunk or a rear hatch. As the host vehicle 10 approaches the target vehicle 20, the beam 32 of sensor 30 begins to impinge on the upper contours of the rear portion of the target object 20. As the beam impinges progressively further up the rear contours of the target object 20, the distance read by the sensor 30 is not the distance to the rear face of the target object 20, but is instead the distance to this portion of the rear contour on which the beam 32 impinges.

FIG. 1C illustrates the host vehicle 10 as it impacts target object 20 at impact point 38. As the vehicles 10, 20 have impacted one another, the distance between them is zero. However, beam 32 is impinging not on the impact point 38, but rather is impinging on a point 48 further up the rear contour of target vehicle 20, which could be further up the trunk or along a rear window, etc. Thus, sensor 30 will continue to read the wrong distance to target object 20 and its sensor location offset compensated distance will be greater than zero.

The point at which the sensor 30 starts to provide inaccurate information is referred to hereinafter as the threshold point. This point is shown in FIG. 1 indicated by numeral 46. When the host vehicle 10 reaches the threshold point 46, the beam 32 from sensor 30 begins providing inaccurate data to the collision detection system (not shown). The sensor 30 continues to provide inaccurate data right through until the host vehicle 10 reaches position 38, when host vehicle 10 impacts target object 20. The area through which the host vehicle 10 travels between the threshold point 46 and the impact point 38 is referred to as the threshold distance 42.

Since the information being gathered by the sensor 30 is incorrect, any predictions of impact time and velocity based thereon will be correspondingly flawed. Accordingly, the present disclosure overcomes this flaw by omitting the information from the sensor 30 from the impact time and impact velocity predictions when the host vehicle 10 is within the threshold distance 46 of the target object 20. In other words, while the host vehicle 10 is approaching the target object 20, the recursive filter 12 initially uses the current prediction of the state (a dynamic property) of the target object, along with the newest sensor reading related to that dynamic property, to further refine (update) the state estimation and then the prediction of the impact time and the velocity. However, once the host vehicle 10 passes the threshold point 46 relative to the target object 20, the recursive filter 12 omits any updated readings from sensor 30 when determining impact time and velocity. The filter 12 may continue to predict the track of the object, updating the estimated "current" location thereof as time passes, though the estimates will be entirely based on a mathematical model, predicting object progression from the previously accepted sensor readings.

When the target vehicle 20 is within the threshold distance 42 of the host vehicle 10, further predictions of impact time and impact velocity are theoretical, unaided by sensor 30 readings. This differs from prior methods of predicting impact time and velocity, which incorporated data from the sensor 30 continually until impact. By ignoring the flawed sensor data, the predictions of impact time and velocity become more accurate.

To determine an expected impact time and velocity, the recursive filter 12 in the collision detection system repeatedly runs the sensor data through at least one algorithm. This provides continuing estimation of relative motion of the target object, and continuing prediction of impact time and impact velocity. When the collision detection system determines that the target object comes within the threshold distance, final state update is performed using the last accepted sensor reading. Based on this finally updated state, the impact time and the impact velocity are predicted. Any further prediction of impact time and impact velocity, as well as further estimation of the state-by the prediction process only - of the target object, are modeled completely mathematically.

Accordingly, in one embodiment, the recursive filter 12 will estimate impact time and impact velocity using a constant acceleration model. The values for the constant acceleration calculations are obtained from the estimates of the relative velocity and relative acceleration of the target object obtained previously from the short range sensor. If the relative acceleration of the target object changes while the target object is within the threshold distance, the accuracy of the impact time and velocity prediction could be adversely affected. Therefore, for the system and method of this disclosure to be effective, the error in the case where the acceleration changes within the threshold distance must sufficiently low.

The following examples are used to demonstrate the error inherent in prediction of impact time and velocity according to the present disclosure, in the unlikely event that the relative acceleration of the target object changes while the relative distance is within the threshold distance. The examples assume the threshold distance is 1 meter, though this is merely exemplary and is not meant to be limiting. The actual threshold distance can be determined based on the individual application. Further, the examples below are being used to demonstrate what is considered a "worst case scenario," having the greatest possible variance in relative acceleration. In the following examples, a host vehicle is approaching target vehicle as illustrated in the FIG. 1D. It is assumed that the driver in the host vehicle 10 saw the target vehicle and applied the full braking. But in the area preceding the threshold distance, when the sensor readings are assumed to be valid and are used in all predictions, the host vehicle is traveling on an icy surface. Accordingly, the acceleration is assumed to be zero. At the exact point when the target object is within the threshold distance, the sensor readings are assumed to be unreliable and are excluded from all further calculations. At this point, the road surface changes from the icy conditions having no acceleration to a dry, paved road surface allowing for a constant deceleration. This will cause the predictions of impact time and velocity to be flawed due to the use of the constant acceleration model assuming a zero acceleration.

As a first example, it is assumed that the host vehicle is approaching a stationary target object at an initial velocity of 10 meters per second. The theoretical impact time and impact velocity are based on sensor readings taken while the host vehicle approaches the threshold point (46a in FIG. 1D). The area preceding the threshold point is an icy surface (40 in FIG. 1D), and thus the acceleration during the time immediately preceding the threshold point is zero. Since the last accepted sensor reading is taken during the period when the acceleration is zero, the "theoretical" acceleration used to estimate impact time and velocity is equal to zero. The surface beginning at the threshold point, and continuing until the impact point, is not icy, however, but is in fact a paved dry surface (42 and 42a in FIG. 1D). The acceleration during this period, the "actual" acceleration, is assumed to be a constant deceleration of 10 m/s². The constant acceleration model is used to predict the impact time and impact velocity.

The "actual" impact time, based on the vehicle encountering a dry paved surface road, is calculated as follows:

$$\int_0^t (v_0 a \tau) d\tau = 1 \text{(meter)},$$

$$(v_0 > 0, a > 0),$$

$v_0$: Initial Speed (m/sec)

$$\Rightarrow v_0 t - \frac{1}{2} a t^2 = 1$$

$$\Rightarrow a t^2 - 2 v_0 t + 2 = 0$$

$$\Rightarrow t = \frac{v_0 \pm \sqrt{v_0^2 - 2a}}{a}$$

Assuming again that the initial velocity is equal to 10 m/s and the acceleration is 10 m/s², $$\Rightarrow t = \frac{10 - \sqrt{10^2 - 2(10)}}{10} = \frac{10 - \sqrt{80}}{10} \approx \frac{1.056}{10} \approx 0.106 \text{ (sec)}$$

In contrast, the collision detection system will estimate impact time and velocity assuming the host vehicle remains on an icy surface. Accordingly, while the initial velocity will still be considered to be 10 m/s, the acceleration is assumed to remain 0. In one embodiment, the acceleration is then ignored. The predicted impact velocity will be 10 m/s, and the predicted impact time is simply distance over velocity:

$$\Rightarrow t = \frac{1}{10} = 0.100 \text{ (sec)}$$

The error in the predicted value is the difference between the "actual" impact time, 0.106 sec, and the "theoretical" impact time, 0.100 seconds. Thus, the error in the above situation, which represents our theoretical worst-case scenario, is t=6 msec.

Figure 1D:
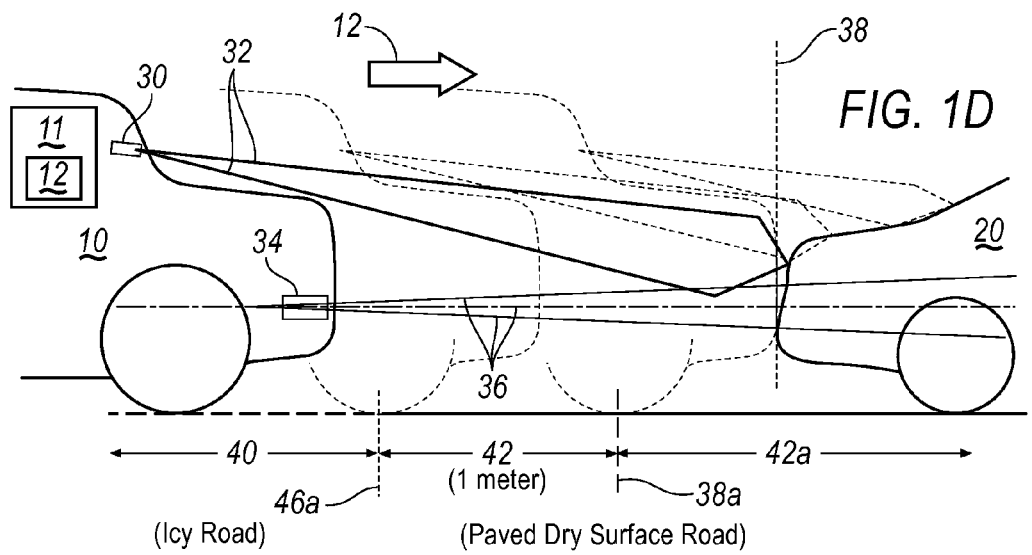
FIG. 1D, a side view of a vehicle employing a short range sensor, according to an embodiment, illustrates the worst case scenario of moving on the two different road surfaces.

A second example demonstrates a vehicle encountering the same conditions as those of the previous example, wherein the road surface is an icy surface (40 in FIG. 1D) until the threshold point (46a in FIG. 1D), at which point the road becomes a paved, dry surface (42 and 42a in FIG. 1D). In this second example, however, the initial velocity is 20 m/s. The "theoretical" acceleration is again assumed to be zero, and the "actual" acceleration is again assumed to be a constant deceleration of 10 m/s².

The "actual" impact time is calculated in this example as:

$$\Rightarrow t = \frac{v_0 \pm \sqrt{v_0^2 - 2a}}{a}$$

$$\Rightarrow t = \frac{20 - \sqrt{20^2 - 2(10)}}{10} =$$

$$\frac{20 - \sqrt{380}}{10} \approx \frac{20 - 19.494}{10} = \frac{0.506}{10} \approx 0.051 \text{ (sec)}$$

The "theoretical" impact time and velocity will again assume the host vehicle remains on an icy surface, and that acceleration is approximately equal to 0. The initial velocity is again assumed to be 20 m/s. In this case, the predicted impact time is simply distance over velocity:

$$\Rightarrow t = \frac{1}{20} = 0.050 \text{ (sec)}$$

The error in the "theoretical" impact time is again simply the difference between the "actual" impact time, 0.051 seconds, and the "theoretical" impact time, 0.050 seconds. Thus, the error in the above situation is t=1 msec, the difference between the computed "actual" impact time and the predicted impact time.

Hence the Impact Time prediction error is at most 6 msec when the initial relative speed is 10 (m/sec) (=22.5 mph) and 1 msec when the initial speed is twice as high. As the initial speed increases, the error decreases.

Another important prediction is the velocity at which a collision is expected to take place. This is important as the velocity of impact may be used to determine, for example, the method in which airbags are to be deployed.

In both of the preceding examples, the "theoretical" impact velocity will be the same as the initial velocity, since the acceleration is assumed to be zero. The "actual" impact velocities will simply be equal to the initial velocity, minus the acceleration multiplied by the time.

Thus, in the first example, when the initial velocity is 10 m/s, the error in the impact velocity is:

$$\left.\begin{array}{l} v_0 10 \text{ (m/sec)} \\ a = 10 \text{ (m/sec}^2) \end{array}\right\} \Rightarrow t \approx 0.106 \text{ (sec)} \Rightarrow \Delta v \approx 0.106 \times 10 = 1.06 \text{ (m/sec)},$$

In the second example, wherein the initial velocity is 20 m/s, the error in impact velocity is:

$$\left.\begin{array}{l} v_0 20 \text{ (m/sec)} \\ a = 10 \text{ (m/sec}^2) \end{array}\right\} \Rightarrow t \approx 0.051 \text{ (sec)} \Rightarrow \Delta v \approx 0.051 \times 20 = 1.02 \text{ (m/sec)}$$

Hence the impact velocity error will be only 1.06 m/s, when the initial velocity is 10 m/s, and the error will be even lower, 1.02 m/s, when the initial velocity doubles. As the initial velocity continues to increase, the error continues to decrease.

Figure 2:
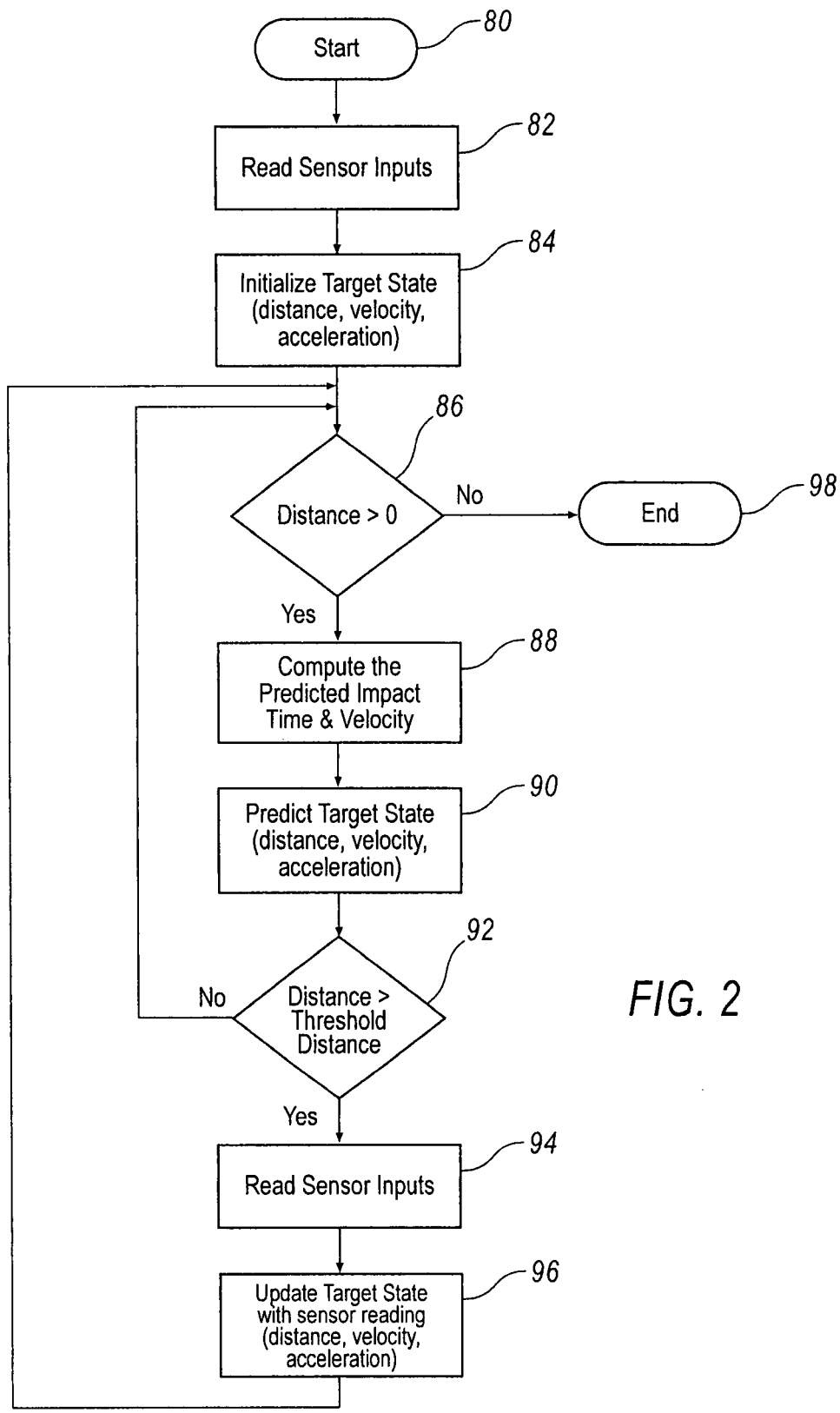
FIG. 2 is a flowchart illustrating an exemplary process for an aspect of a collision detection system according to an embodiment.

FIG. 2 illustrates a flow diagram demonstrating one exemplary method in which teachings of this disclosure can be implemented. The process begins at step 80, with a sensor obtaining information about target objects. The method continues at step 82 with reading the sensor data. Step 84 generates the initial state of the target that was detected by the sensor. In step 86, the distance term of the state is checked if it is greater than zero. If it is not the case, the predicted impact time and the impact velocity are not computed, and the program is terminated for the target under consideration in Step 98. On the other hand, if the distance is greater than zero, the predicted impact time and the impact velocity are computed in step 88. Afterwards the target state is predicted for the next step time in step 90. Then the distance term of the target's predicted state is compared with the threshold distance in step 92. If the distance is greater than the threshold distance, the sensor reads the new inputs in step 94, and then updates (refines) the target state (relative position, velocity and acceleration) in step 96 with the sensor inputs. Then it goes back to step 86 to run the next cycle of operation. But if the distance is equal to or less than the threshold distance, the collision detection system ignores the new sensor readings and bypasses to the step 86.

Figure 3A:
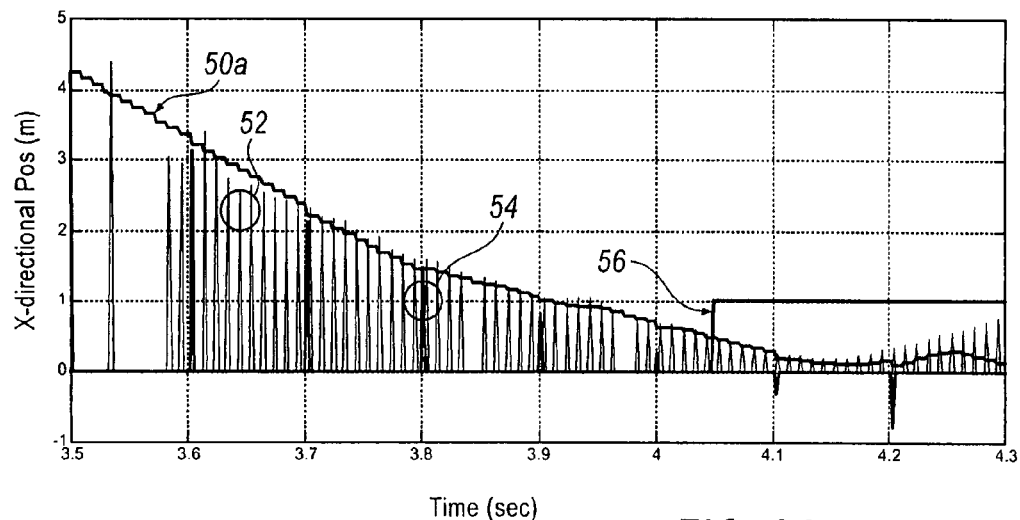
FIG. 3A is a graph showing target distance estimates before the use of the present disclosure.
Figure 3B:
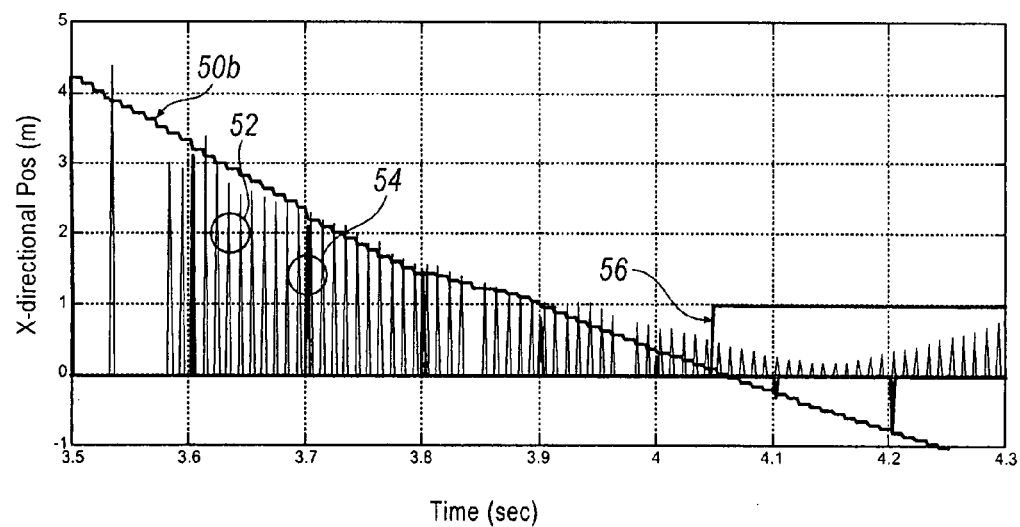
FIG. 3B is a graph showing target distance estimates when using an embodiment of the present disclosure
Figure 4A:
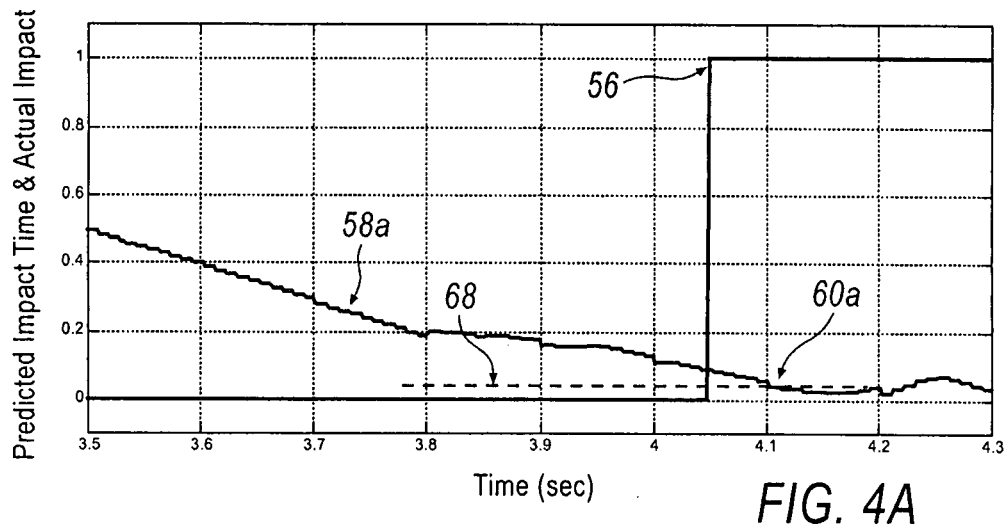
FIG. 4A is a graph showing predicted impact time before the use of the present disclosure.
Figure 4B:
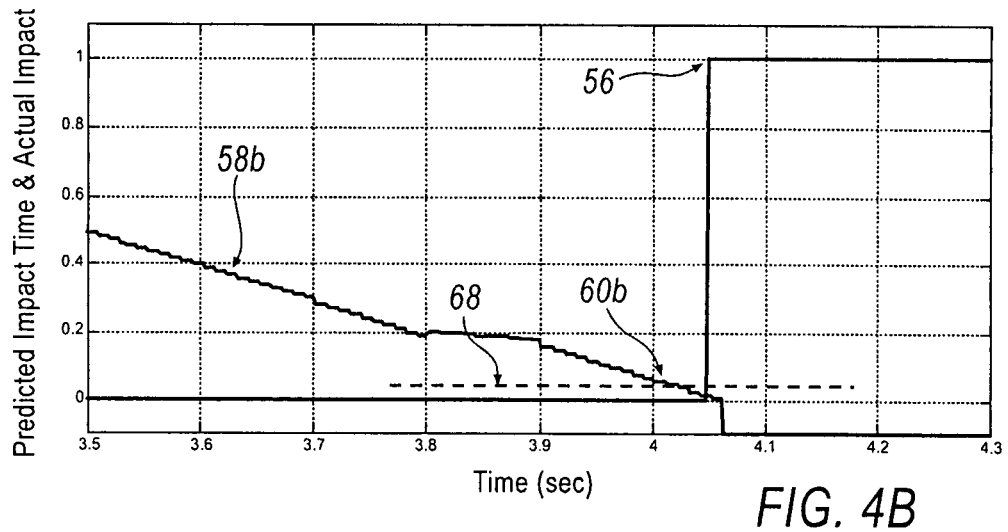
FIG. 4B is a graph showing predicted impact time when using an embodiment of the present disclosure.
Figure 5:
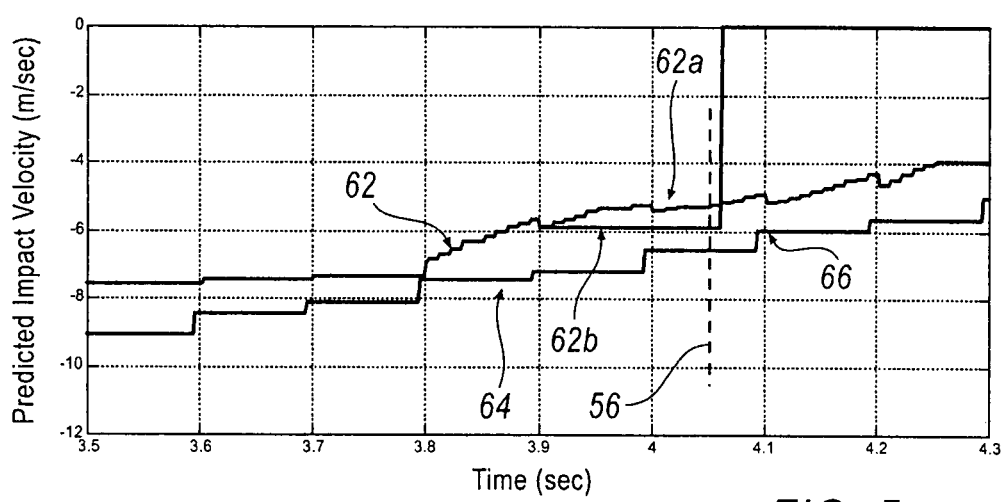
FIG. 5 is a graph showing predicted impact velocities before the use of the present disclosure, as well as when using an embodiment of the present disclosure.

FIGS. 3-5 graphically illustrate results of real world tests using an embodiment of the present disclosure. The test is merely exemplary of an embodiment according to the present disclosure, and is not meant to be limiting. The test involved a host vehicle equipped with two sensors, a short range LIDAR sensor and a long range radar sensor, colliding with a stationary target object. The target object for this test was a large balloon in the shape of a passenger sedan. The threshold distance for the test was set at 1 meter. The figures are used to illustrate the improvements obtained by implementing an embodiment of the present disclosure. These improvements are illustrated by plotting predicted values both before implementation, and after implementation, of an embodiment of the present disclosure, as well as plotting the actual values for the data estimated. FIGS. 3A and 3B illustrate the improvement obtained in predicting the distance to a target object. FIGS. 4A and 4B illustrate the improvement obtained in predicting the impact time for an impending collision. Finally, FIG. 5 graphically illustrates the improvement obtained in predicting the impact velocity, both before and after implementation of an embodiment of the present disclosure.

FIGS. 3A and 3B illustrate distance estimates to the target object before, and after, implementing an embodiment of the present disclosure. Both FIGS. 3A and 3B illustrate short range sensor readings 52 and long range sensor readings 54. It can be seen from the number of short ranges sensor readings 52 compared to the number of long range sensor readings 54 that the frequency of the short range sensor is much higher than the frequency of the long range sensor. This higher frequency allows more readings of the target object to be taken, and improves prediction accuracy. In addition to the higher frequency, the short range sensor usually has better measurement accuracy than the long range one. For this reason, the signal from the short range sensor dominates the state estimation by the recursive filter 12. Based on the short range sensor readings 52, the recursive filter 12 estimates the distance to the target object 50a and 50b.

As can be seen in comparing FIG. 3A to FIG. 3B, the distance estimates 50a and 50b are identical from time 3.5 sec until the time is approximately 3.9 seconds. Once the time reaches 3.9 seconds, the collision detection system determines that the distance to the target object is 1 meter, which brings the target object within the set threshold distance. Once the target object is within the threshold distance, the graphs diverge.

FIG. 3A illustrates the distance estimate 50a using known methods, where the information from the short range sensor is continually used by the recursive filter 12 in estimating target object distance, until the actual collision. FIG. 3B, on the other hand, illustrates the distance estimate 50b according to a collision detection system using an embodiment of the present disclosure. When the target object is within the threshold distance, the signal from the short range sensor 52 is omitted from any distance estimations.

The vertical line segment 56 indicates the moment at which the host vehicle collides with the target object. The distance to the target object at this point is zero. FIG. 3A indicates that at point 56, the predicted target distance is approximately 0.5 meters. FIG. 3B indicates an estimated distance of approximately 0.1 meters. In other words, the present disclosure provides object distance estimates having five times greater accuracy than known methods.

FIGS. 4A and 4B illustrate the predicted impact time before (line 58a), and after (line 58b), implementing an embodiment of the present disclosure respectively. Similar to the plot of target distance in FIGS. 3A and 3B, lines 58a and 58b are identical until for the early portion of the time plot. Again, the lines diverge at approximately 3.9 sec, when the target object comes within the threshold distance.

Impact time and velocity predictions are generally used for some purpose, such as preparing or activating safety features. Accordingly, the predicted impact times must be sent to vehicle safety systems prior to the actual impact, to allow the system to take whichever action is desired. In the present example, it was decided that the predicted impact time would be transmitted 50 msec prior to the expected impact. That is, once the predicted time to impact is less than 50 msec, the time prediction is transmitted to the appropriate vehicle safety system. Dashed line 68 indicates the 50 msec point.

The vertical portion of line 56 indicates that the actual impact time, when the host vehicle collides with the target object, is 4.050 sec.

FIG. 4A shows at line 58a the impact time prediction using known methods of impact time prediction. The prediction according to the known method indicates, indicates at time 4.104 seconds, that the time to impact is 34 msec. Thus, the predicted time of impact using prior methods is 4.138 seconds.

Line 58b, which shows impact time prediction using an embodiment of the present disclosure, indicates at time 4.014 seconds that impact will occur in 44 msec. Thus, the predicted time of impact using the present embodiment 4.058 msec.

The error in prediction methods is the difference between the predicted value and the actual value. Using prior methods, the error is equal to 4.138-4.050 seconds=0.088 seconds. Using an embodiment of the present disclosure, the error is only 4.058-4.050 seconds=0.008 seconds. Thus, using an embodiment of the present disclosure provides impact time predictions which are more than 90.9% more accurate than prior art methods.

FIG. 5 illustrates the predicted impact velocity 62, both before 62a and after 62b implementing an embodiment of the present disclosure. Vertical line 56 indicates the actual time at which impact occurred. Point 66 indicates the actual velocity at impact, which is read from the vehicle Antilock Brake System (ABS) module, as being 6.01 meter/sec. The actual velocity is delayed on the graph due to the time delay in the signal emitted by the velocity sensor. In this example, the target object is stationary and thus the host vehicle velocity from the ABS sensor is identical to the relative velocity of the host vehicle to the target object.

As with the prior figures, the predictions 62 are identical until the target object comes within the threshold distance, at which point they differ. Line 62a indicates the impact velocity predictions using known methods. Using the known method, the impact velocity is predicted to be 5.19 meters/sec. Line 62b illustrates the prediction of impact velocity using an embodiment of the present disclosure. The line indicates that the predicted velocity at impact will be 5.93 meters/sec.

The error inherent in the two methods of predicting impact velocity is the difference between each prediction and the actual value. As stated above, the actual impact velocity is 6.01 meters/second. The known method 62a has an error of 6.01-5.16 meters/second=0.82 meters/second. On the other hand, the prediction 62b using an embodiment of the present disclosure has an error of 6.01-5.93 meters/second=0.08 meters/second. Thus, using an embodiment of the present disclosure provides impact velocity predictions which are more than 90% more accurate than prior art methods.

In the disclosed embodiments, the threshold distance was set to 1 meter. It is to be understood that the threshold distance could be set to any distance desired, and is not limited to 1 meter. Further, it is to be understood that the threshold distance could be determined dynamically, such as by using a vision system to determine when the short range sensor will impinge the target object at an undesirable point. Further, the threshold distance could be selected from a series of values stored in a look up table, or memory.

What is claimed is:

1. A system for impact time and velocity prediction, comprising:
    at least one mid-range or long-range sensor operative to detect information regarding a geometric profile of a target object;
    at least one short-range sensor behind a windshield on a downward angle, the short-range sensor being operative to detect information regarding a target object; and
    a recursive filter in communication with each of the sensors to receive data therefrom;
    wherein, when the target object is within a threshold distance of the host vehicle, detected information from the at least one short-range sensor is presumed inaccurate and the recursive filter omits said presumptively inaccurate information for use in predictions of at least a time and velocity of impact between the host vehicle and the target object.

2. The system of claim 1, wherein the at least one short-range sensor is a LIDAR sensor.

3. The system of claim 1, wherein the at least one mid-range or long-range sensor is a long-range LADAR sensor.

4. The system of claim 1, wherein the recursive filter is a Kalman filter.

5. The system of claim 1, wherein the prediction of the time or the velocity at which the host vehicle will impact the target object is used to prepare or activate vehicle safety systems.

6. A method of predicting the time and/or velocity at which a host vehicle will impact an object, including:
    obtaining data relating to a potential target object from a short-range sensor placed behind a windshield at a downward angle and a long-range sensor; said data from said long range sensor including geometric profile of said target object;
    providing the data as an input to a recursive filter;
    determining a threshold distance between a target object and a host vehicle wherein data sensed from at least the short-range sensor is presumptively inaccurate; and
    omitting presumptively inaccurate data in estimation calculations of at least the time and velocity at which a host vehicle will impact a target object.

7. The method of claim 6, wherein the short-range sensor is a LIDAR sensor.

8. The method of claim 6, wherein the long-range sensor is a LADAR sensor.

9. The method of claim 6, wherein the recursive filter is a Kalman filter.

10. The system of claim 1, wherein the system uses information detected by the short range sensor immediately preceding the target vehicle entering the threshold distance to predict at least the time and velocity of impact.

11. The method of claim 6, further including predicting at least the time and velocity of impact by using information detected by the short range sensor immediately preceding the target vehicle entering the threshold distance.

* * * * *